S. K. LOVEWELL & L. L. LAMB.
BAND SAWING-MACHINE.

No. 173,731. Patented Feb. 22, 1876.

Witnesses.
C. Warren Brown
T. C. Westlake

Inventors.
S. K. Lovewell
Levi L. Lamb

UNITED STATES PATENT OFFICE.

SEWALL K. LOVEWELL AND LEVI L. LAMB, OF CHELSEA, MASS.

IMPROVEMENT IN BAND SAWING-MACHINES.

Specification forming part of Letters Patent No. 173,731, dated February 22, 1876; application filed May 15, 1875.

*To all whom it may concern:*

Be it known that we, SEWALL KIMBALL LOVEWELL and LEVI LYSANDER LAMB, both of Chelsea, in the county of Suffolk and State of Massachusetts, have invented an Improved Band Sawing-Machine; and we do hereby declare that the following, taken in connection with the drawings which accompany and form part of this specification, is a description of our invention sufficient to enable those skilled in the art to practice it.

The principal features in our invention consist in the peculiar manner in which we always maintain an equal strain upon the saw-blade, whether it is stationary and cool, or whether it is in motion and heated. To accomplish this result we place springs in such positions that, as the carrying-wheels are adjusted to tighten the saw, the strain or pressure on the saw-blade compresses the springs. When the saw is in motion and becomes heated, the springs relax and take up the slack occasioned by the expansion of the saw-blade, always keeping it tight, while, as the blade contracts, the springs are again compressed.

Another feature is, that we make our uprights, which support the arbors, square or hexagonal, and place around them in the frame Babbitt metal, thereby preventing their twisting or turning about.

Another feature is, that we place the lower guide for the saw-blade very near the working-surface of the table by grooving the under side of the table, sliding the guide into said groove, and holding it firmly in place by a thumb-screw.

Figure 1:
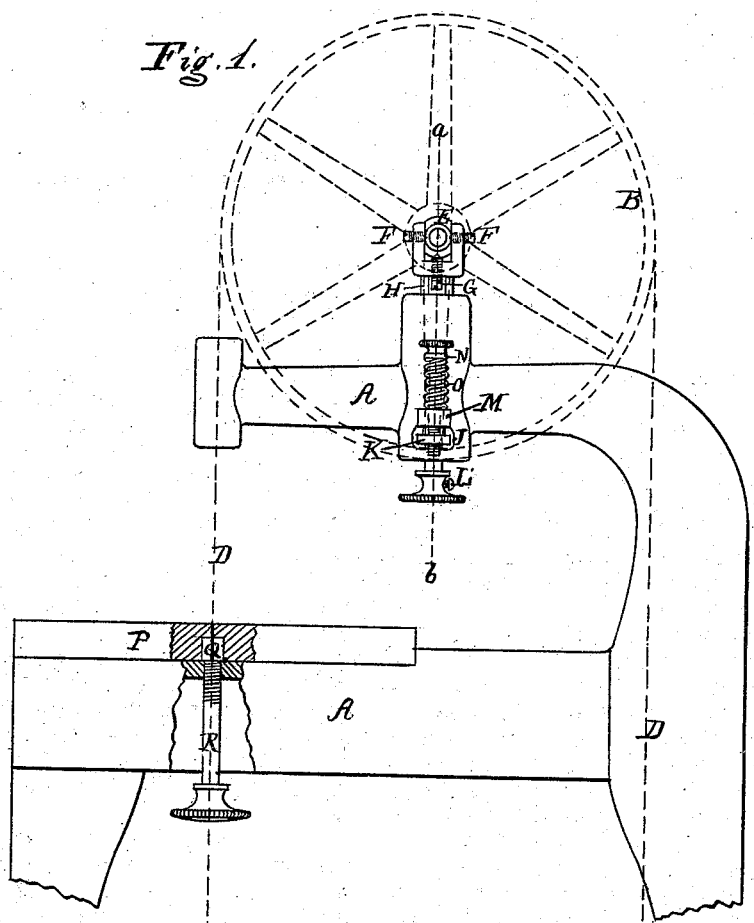
Figure 2:
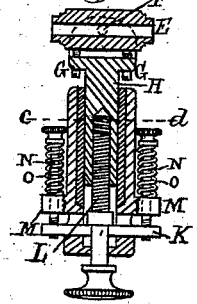
Figure 3:
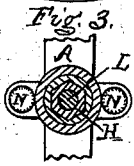

In the drawings which accompany and form a part of this specification, Figure 1 is a side elevation of an apparatus embodying our invention. Fig. 2 is a sectional elevation taken on the line *a b*, and Fig. 3 is a sectional plan taken on the line *c d*.

A represents the frame; B C, the carrying-wheels, and D the saw-blade. E represents the bearing for the arbor, pivoted at F, and vertically adjusted by the screw G. The bearing E is pivoted in the upright H, which is in the shape of a polygon, and extends down into the frame, being surrounded and held in position by Babbitt metal, as shown in Figs. 2 and 3. An opening is made through the frame at J, through which extends the piece K. The screw L is enlarged above this horizontal piece K, so that as the screw is turned the upright and the horizontal piece are drawn toward or forced away from each other at will. On the outside of the frame are ears M, through which are passed rods N, said rods being tapped into the horizontal piece K and surrounded by the spiral springs O.

To adjust a saw upon this machine it simply becomes necessary to place the saw over the carrying-wheels, then turn the vertically-adjusting screw, forcing the carrying-wheel upward until the springs O are slightly compressed, when the tension will be kept equal at all times.

It is evident that, while we have described this apparatus as applied to the upper carrying-wheel only, it may be applied with equal facility to the lower one also.

In order to get the lower guide as near as possible to the work, thereby lessening the tendency to bend and break the saw-blade, we groove the bed P, and place therein the guide Q, which, when in position, is held firmly by the screw R.

We claim—

1. In a band sawing-machine, the combination of the upright H with the vertically-adjusting screw L, horizontal piece K, rods N, springs O, and frame A, substantially as shown and described.

2. In a band sawing-machine, the upright H, when its cross-section is a polygon, and it is held in vertical position by Babbitt metal, as described, in combination with the vertically-adjusting screw L and frame A.

3. In a band sawing-machine, the combination, with the frame A, of the carrying-wheel B, pivoted bearing E, set-screws G, upright H, screw L, horizontal piece K, rods N, and springs O, substantially as described.

S. K. LOVEWELL.
LEVI L. LAMB.

Witnesses:
C. WARREN BROWN,
HENRY F. STARBUCK.